US011277730B2

(12) United States Patent
Goto (10) Patent No.: US 11,277,730 B2
(45) Date of Patent: Mar. 15, 2022

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/287,379

(22) Filed: Feb. 27, 2019

(65) Prior Publication Data

US 2019/0274027 A1 Sep. 5, 2019

(30) Foreign Application Priority Data

Mar. 1, 2018 (JP) .............................. JP2018-036737

(51) Int. Cl.
| H04W 8/00 | (2009.01) |
| H04N 1/32 | (2006.01) |
| H04N 1/00 | (2006.01) |
| H04W 84/12 | (2009.01) |

(52) U.S. Cl.
CPC ........ *H04W 8/005* (2013.01); *H04N 1/00307* (2013.01); *H04N 1/00408* (2013.01); *H04N 1/32117* (2013.01); *H04N 2201/0094* (2013.01); *H04W 84/12* (2013.01)

(58) Field of Classification Search
CPC ................. H04W 8/005; H04W 8/186; H04N 2201/0094; H04L 67/26
See application file for complete search history.

(56) References Cited

U.S. PATENT DOCUMENTS

| 8,201,082 B1* | 6/2012 | Nordstrom ............ G06F 40/186 |
| | | 715/234 |
| 8,918,500 B2 | 12/2014 | Goto |
| 9,271,312 B2 | 2/2016 | Goto |
| 9,307,387 B2 | 4/2016 | Sakai et al. |

(Continued)

FOREIGN PATENT DOCUMENTS

| JP | 2007114938 A | 5/2007 |
| JP | 2017063310 A | 3/2017 |

OTHER PUBLICATIONS

Notice of Reasons for Refusal issued by the Japan Patent Office dated Jan. 7, 2022 in corresponding JP Patent Application No. 2018-036737, with English translation.

*Primary Examiner* — King Y Poon
*Assistant Examiner* — Michael Burleson
(74) *Attorney, Agent, or Firm* — Carter, DeLuca & Farrell LLP (57) ABSTRACT

A communication apparatus operable to comply with a NAN (Neighbor Awareness Networking) standard, receives, from one or more other communication apparatuses, publish messages respectively indicating a plurality of services, and causes a display unit to display the one or more other communication apparatuses that transmitted the publish messages, wherein, if a plurality of services indicated by a plurality of received publish messages are services provided by the same other communication apparatus, the display unit is caused to display this one other communication apparatus.

9 Claims, 4 Drawing Sheets

(56) References Cited

U.S. PATENT DOCUMENTS

| | | | |
|---|---|---|---|
| 9,497,788 B2 | 11/2016 | Goto | |
| 9,872,129 B2 | 1/2018 | Goto | |
| 9,980,084 B2 | 5/2018 | Goto | |
| 10,200,903 B2 | 2/2019 | Goto et al. | |
| 2004/0213614 A1* | 10/2004 | Uchida | G06F 3/1285 400/62 |
| 2014/0302787 A1* | 10/2014 | Rantala | H04W 4/80 455/41.2 |
| 2016/0157193 A1* | 6/2016 | Qi | H04W 56/00 370/350 |
| 2017/0094496 A1* | 3/2017 | Aoki | H04L 69/28 |
| 2017/0223764 A1* | 8/2017 | Lim | H04W 4/60 |
| 2018/0041940 A1* | 2/2018 | Tsai | H04L 67/325 |

* cited by examiner

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a technique for, in a communication apparatus, recognizing another communication apparatus.

Description of the Related Art

In recent years, wireless LANs (Local Area Networks) typified by the IEEE 802.11 standard series are widely used. In a wireless LAN, in many cases, the network is controlled by a base station referred to as an access point (AP). A wireless network is configured by this AP and stations (STA) that are present within a range where radio waves from the AP reach and are in a state of being wirelessly connected.

In addition to such a conventional simple wireless network configuration in accordance with an AP and STAs, products and specification standards with various wireless LAN network forms are appearing. US-2014-0302787 recites NAN (Neighbor Awareness Networking) which is defined by the Wi-Fi Alliance as a standard for discovering a communication apparatus that is saving power or a service or the like provided thereby.

In NAN, an apparatus that searches for services, for each desired service, searches for an opposing apparatus that can provide the desired service. Accordingly, the apparatus that searches for services may make a misrecognition when one opposing apparatus provides a plurality of services. For example, it could mistakenly recognize that there are a plurality of opposing apparatuses for one opposing apparatus that provides a plurality of services.

SUMMARY OF THE INVENTION

The present disclosure, in light of the foregoing problem, provides a technique for, when searching for a service, resolving a misrecognition with respect to an opposing apparatus that can provide a plurality of services.

According to one aspect of the present invention, there is provided a communication apparatus operable to comply with a NAN (Neighbor Awareness Networking) standard, comprising: a receiving unit configured to receive, from one or more other communication apparatuses, publish messages respectively indicating a plurality of services; and a display control unit configured to display, on a display unit to display the one or more other communication apparatuses that transmitted the publish messages, wherein, if a plurality of services indicated by a plurality of publish messages received by the receiving unit are services provided by the same other communication apparatus, the display control unit causes the display unit to display this one other communication apparatus.

Further features of the present invention will become apparent from the following description of exemplary embodiments (with reference to the attached drawings).

DESCRIPTION OF THE EMBODIMENTS

Description is given below for an embodiment of the present invention with reference to the drawings. Note that, while it is assumed that each communication apparatus below has a wireless LAN communication function compliant with an IEEE 802.11 standard series, there is no limitation to this. In addition, while it is assumed that each communication apparatus below is an NAN device that can, by NAN which is defined by the Wi-Fi Alliance, discover another communication apparatus as well as a service provided thereby, there is no limitation to this. In other words, in the description below, while technical terms corresponding to a certain standard are used below, it is possible to apply respective arguments below in another similar type of standard.

Description is given regarding NAN (Neighbor Awareness Networking). In NAN, communication of service information is performed in a time period referred to as a Discovery Window (hereinafter referred to as a "DW"). As described below, service information is a subscribe message which is a signal for discovering a service, a publish message which is a signal for notifying that a service is being provided, or the like. In addition, a DW is an amount of time that is defined for each channel in which a plurality of devices that execute NAN can perform "converge". In addition, a group of communication apparatuses that share a DW schedule is referred to as a NAN cluster.

Each communication apparatus belonging to a NAN cluster operates in one role from among Master, Non-Master Sync, and Non-Master Non-Sync. A communication apparatus that operates as Master identifies that each communication apparatus is in the DW, and transmits a synchronization beacon (hereinafter referred to as a "sync beacon") which is a beacon for synchronization. In addition, the communication apparatus that operates as Master transmits a discovery beacon which is a signal for allowing a communication apparatus that does not belong to the NAN cluster to recognize the NAN cluster. The discovery beacon may be transmitted outside of the DW time period each 100 TU (Time Unit, 1 TU is 1024 µs), for example. Note that, in each NAN cluster, at least one communication apparatus operates as Master.

A communication apparatus that operates as Non-Master Sync transmits a sync beacon, but does not transmit a discovery beacon. A communication apparatus that operates as Non-Master Non-Sync does not transmit a sync beacon or a discovery beacon.

In accordance with the sync beacon, a communication apparatus that participates in the NAN cluster synchronizes with the DW period for each predetermined period, and communicates service information in the DW period. Specifically, the communication apparatuses mutually communicate, in the DW period, subscribe messages which are signals for discovering a service or publish messages which are signals for notifying that a service is being provided. Furthermore, respective communication apparatuses can exchange a follow-up message for switching additional information relating to a service in a DW period. Note that a message such as "publish", "subscribe", and "follow-up" is referred to as a Service Discovery Frame (SDF) as a generic name. Respective communication apparatuses can exchange SDFs to advertise or detect a service.

(Configuration of Wireless Communication System)

Figure 1:
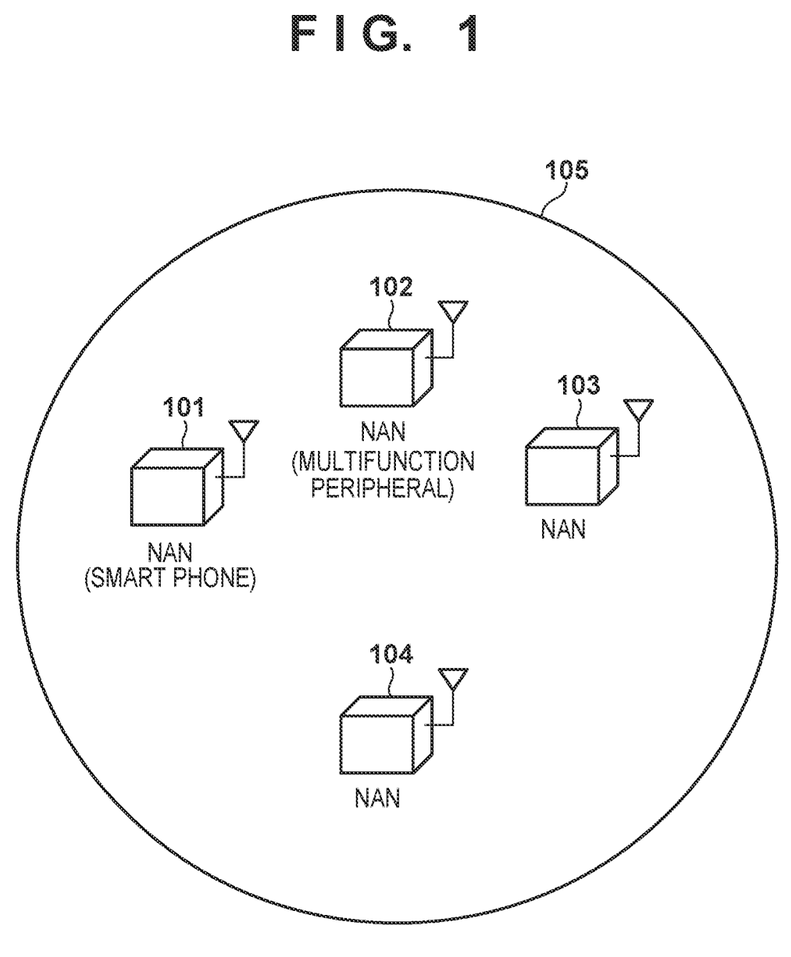
FIG. 1 illustrates an example of a configuration of a wireless communication system.

FIG. 1 is used to describe an example of configuration of a wireless communication system of one embodiment of the present invention. The wireless communication system of the present embodiment is configured by including an NAN 101 through an NAN 104 which are communication apparatuses that each comply with a NAN standard (are NAN devices), and NAN 101 through 104 participate in a NAN cluster 105. In the present embodiment, the NAN devices (NAN 101 through 104) that participate in the NAN cluster 105 construct a network by a frequency channel 6 (6ch) in the 2.4 GHz band. Here, for the NAN cluster 105, the length of a DW period is 16 TU and a time interval from the start timing of one DW period until the start timing of the next DW period is 512 TU. In addition, DW periods are time periods for which 16 DW periods DW0 through DW15 are one cycle, and 16 DW periods after DWn (where n is an integer from 0 to 15) is DWn again. In other words, DW16 corresponds to the next DW0. It is assumed that the NAN 101 through the NAN 104 that participate in the NAN cluster 105 can always receive a wireless signal in at least DW0.

The NAN 101 is a communication apparatus that can execute various processing described below. It is assumed that the NAN 101 participates in the NAN cluster 105 as Non-Master Non-Sync. The NAN 102 is a communication apparatus that participates in the NAN cluster 105 as Master. The NAN 102 receives wireless signals in all DW periods, and transmits a sync beacon in all DW periods. The NAN 103 and the NAN 104 are communication apparatuses that participate in the NAN cluster 105 as Non-Master Non-Sync.

(Configuration of NAN 101)

Figure 2:
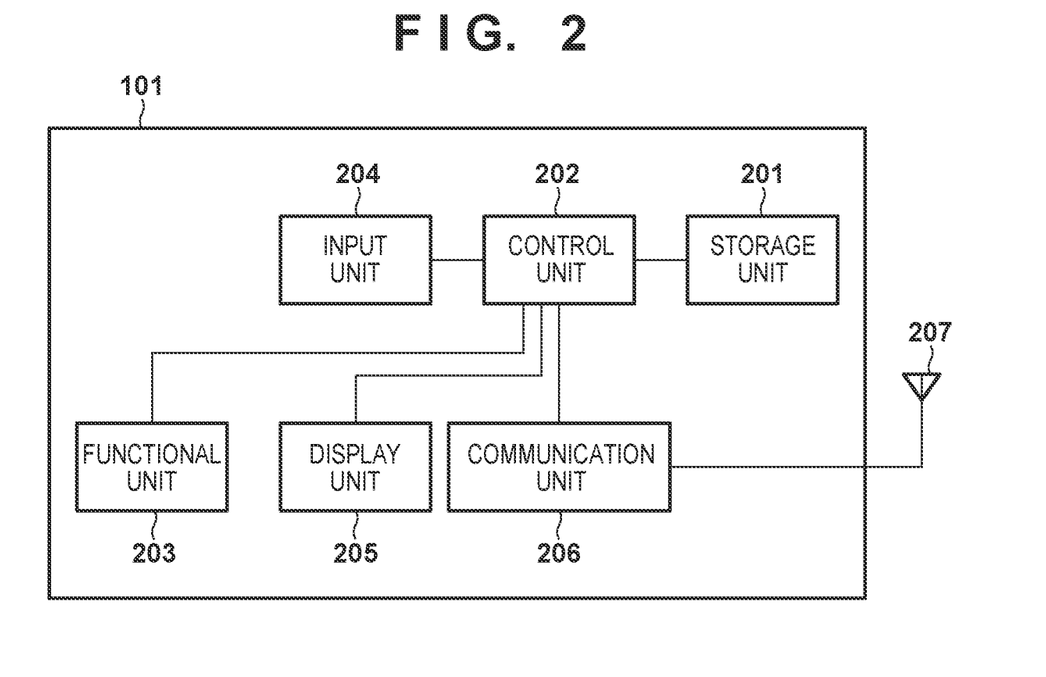
FIG. 2 is a block diagram that illustrates an example of a hardware configuration of an NAN 101.

FIG. 2 illustrates a hardware configuration of the NAN 101 in the present embodiment. The NAN 101 has a storage unit 201, a control unit 202, a functional unit 203, an input unit 204, a display unit 205, a communication unit 206, and an antenna 207 as an example of its hardware configuration.

The storage unit 201 is configured by both of one or more ROMs (Read Only Memory) and a RAM (Random Access Memory), or at least one of these. The storage unit 201 stores a program for performing various operations described below, and various information such as a communication parameter for wireless communication. Note that, as the storage unit 201, a storage medium such as a floppy disk, a hard disk, an optical disc, a magneto-optical disc, a CD-ROM, a CD-R, a magnetic tape, a non-volatile memory card, or a DVD, may be used in addition to a memory such as a ROM or a RAM.

The control unit 202 is configured by one or more CPUs (Central Processing Unit) or MPUs (Micro Processing Unit). The control unit 202 controls the entirety of the NAN 101 by executing a program stored in the storage unit 201. Note that the control unit 202 may control the entirety of the NAN 101 by cooperating with a program and an OS (Operating System) stored in the storage unit 201.

In addition, the control unit 202 controls the functional unit 203 to execute predetermined processing such as image capturing, printing or projection. The functional unit 203 is hardware for the NAN 101 to execute predetermined processing. For example, if the NAN 101 functions as a camera, the functional unit 203 is an image capturing unit and performs image capturing processing. For example, if the NAN 101 functions as a printer, the functional unit 203 is a printing unit and performs print processing. For example, if the NAN 101 functions as a projector, the functional unit 203 is a projection unit and performs projection processing. Data that the functional unit 203 processes may be data stored in the storage unit 201, and may be data communicated from another NAN device via the communication unit 206 which is to be described later.

The input unit 204 accepts various operations from a user. The display unit 205 displays various information to a user. Note that both of the input unit 204 and the display unit 205 may be realized by one module as with a touch panel.

The communication unit 206 controls wireless communication compliant with an IEEE 802.11 standard series, and controls IP communication. In addition, the communication unit 206 controls the antenna 207 to transmit or receive a wireless signal for wireless communication. The NAN 101 communicates content such as image data, document data, or video image data to another communication apparatus via the communication unit 206. In accordance with control by the control unit 202, in a DW period where a wireless signal is not transmitted or received, the communication unit 206 is not supplied with power, and can enter a DOZE state.

Figure 3:
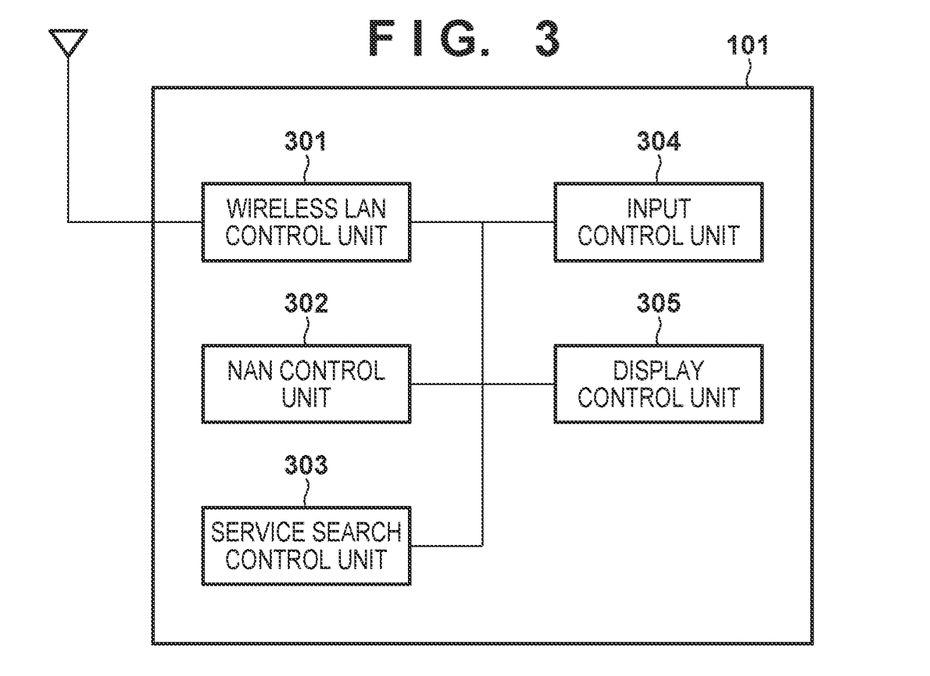
FIG. 3 is a block diagram that illustrates an example of a functional configuration of the NAN 101.

FIG. 3 is a block diagram that illustrates an example of a functional configuration of the NAN 101. As a functional configuration, the NAN 101 has a wireless LAN control unit 301, a NAN control unit 302, a service search control unit 303, an input control unit 304, and a display control unit 305, for example.

The wireless LAN control unit 301 performs control for transmitting and receiving wireless signals with another wireless LAN apparatus such as an NAN device. For example, the wireless LAN control unit 301 executes wireless LAN communication control in accordance with an IEEE 802.11 standard series. The NAN control unit 302 performs communication control in accordance with an NAN standard. The service search control unit 303 controls the NAN control unit 302 to realize search and report functions for services of other NAN devices. The input control unit 304 transfers an input signal, in accordance with an operation by a user with respect to an input unit 204 (FIG. 2), to a corresponding configuration element. The display control unit 305 controls display of various information to the display unit 205 (FIG. 2).

(Processing Flow)

Figure 4:
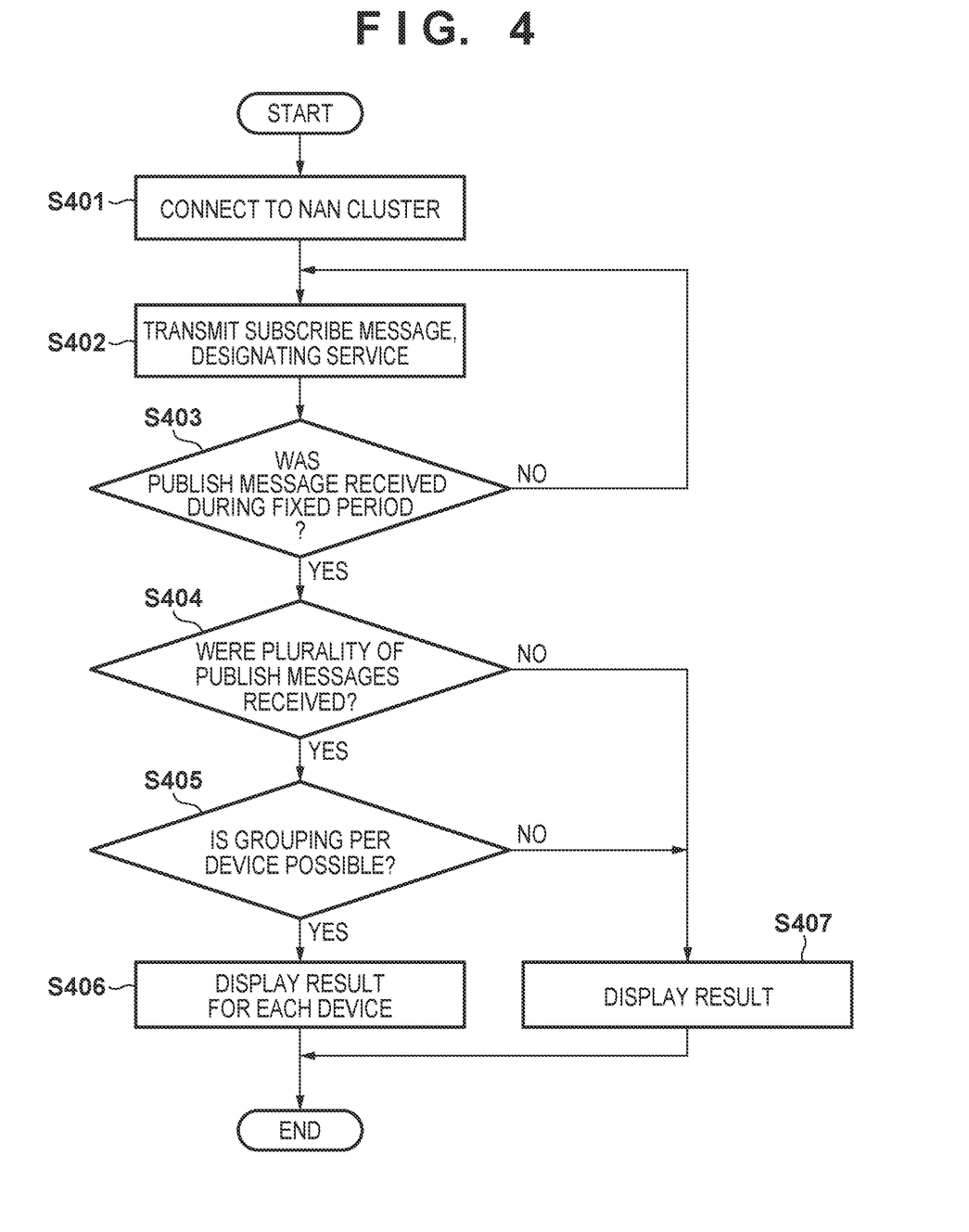
FIG. 4 is a flowchart of processing executed by the NAN 101.

Next, with reference to FIG. 4, description is given regarding operation of the NAN 101 which has the configuration described above. FIG. 4 is a flowchart of processing executed by the NAN 101. The flowchart illustrated by FIG. 4 can be realized by the control unit 202 of the NAN 101 executing a control program stored in the storage unit 201 to execute control of respective hardware as well as processing and calculations on information.

It is envisioned that the NAN 101 is a device such as a smart phone, and the NAN 102 is a device such as a multifunction peripheral that can provide a print service and a scan service (refer to FIG. 1). For example, the NAN 102 registers services "net.abc.nan.print_service" and "net.abc.nan.scan_service" as service names according to an NAN specification, by a publish method that is defined in the NAN specification. By this, the NAN 102 can transmit a publish message for each service, in other words a publish message that respectively designates "net.abc.nan.print_service" or "net.abc.nan.scan_service". In addition, configuration may be taken such that the NAN 102 starts up an interface for NAN (an NAN interface) for each service, and each service acts as an independent NAN device, and transmits a publish message that designates the respective service.

Before the processing of step S401, the NAN 101 can implement a service search for services that are not provided by NAN. Something that is not provided by NAN is provided by Bluetooth (registered trademark), Wi-Fi Direct, normal Wi-Fi, or the like, for example.

When, via the input unit 204, a user instructs a service search for a service provided by NAN, the input control unit 304 instructs the NAN control unit 302 to perform a service search. Upon receiving this, the NAN control unit 302 searches for services provided by respective NAN devices that are participating in the NAN cluster 105, and therefore connects to the NAN cluster 105 (step S401). Note that, because this connection processing is not the main focus of the present invention, description thereof is omitted.

After connecting to the NAN cluster 105, the NAN control unit 302 of the NAN 101, in accordance with control by the service search control unit 303, transmits a subscribe message that is a signal for discovering services (step S402). For example, in a case where the NAN 101 searches for a print service and a scan service, the NAN control unit 302 calls a subscribe method defined in the NAN specification, designating "net.abc.nan.print_service" and "net.abc.nan.scan_service". By this, the NAN control unit 302 transmits a subscribe message that designates "net.abc.nan.print_service" and "net.abc.nan.scan_service". Note that, in the NAN standard, an NAN device that transmits a publish message operates by selecting both or one of an unsolicited mode and a solicited mode. The solicited mode is a mode for transmitting a publish message only when a subscribe message is received, and the unsolicited mode is a mode for voluntarily transmitting a publish message even if a subscribe message is not received. In either of these modes, a side that searches for a service (the sender of the subscribe message) can receive a publish message.

After transmitting the subscribe message, the NAN control unit 302 determines whether one or more publish messages have been received in a fixed period (step S403). The publish message corresponds to information relating to a service that an NAN device can provide. Note that the fixed period may be any amount of time that is predefined in advance, and may be an amount of time that can be set by a user. If it is determined by the NAN control unit 302 that one or more publish messages are received (Yes in step S403), the processing proceeds to step S404. However if it is determined by the NAN control unit 302 that one or more publish messages have not been received (Yes in step S403), the processing returns to step S402. Alternatively, if a desired device was found by means other than NAN (for example, Bluetooth, Wi-Fi Direct, or the like that were mentioned above), the NAN 101 may end the processing for searching for services.

In step S404, the NAN control unit 302 determines whether a plurality of publish messages have been received. When it is determined that one publish message instead of a plurality is received (No in step S404), the display controller 306 displays information corresponding to the received publish message on the display unit 205. The displayed information is a service name, or an apparatus name, for example.

In contrast, if it is determined that a plurality of publish messages are received (Yes in step S404), the NAN control unit 302 further determines whether the plurality of publish messages can be grouped by each transmitting NAN device (step S405). In other words, the NAN control unit 302 determines whether at least two messages out of the plurality of publish messages can be associated with a specific NAN device. The determination in step S405 can use NAN device identification information that is included in a publish message. For example, it is possible to perform the determination using address information of an NAN interface (NAN Interface Address) or service-specific information (Service Specific Info). Note that it is desirable to use the service-specific information in a case where it is possible to determine the same NAN device by comparing NAN interface address information included in respective ones of the plurality of publish messages but one NAN interface is activated for each service. For example, it is possible to use a UUID (Universally Unique Identification) or information unique to each NAN device (such as a product serial number attached at a time of manufacturing).

If it determined that the plurality of publish messages can be grouped by a transmitting NAN device, for example if NAN device identification information in the plurality of publish messages match (Yes in step S405), the processing proceeds to step S406. In step S406, the display control unit 305 displays a plurality of pieces of information that correspond to the plurality of publish messages altogether on the display unit 205 (step S406). In contrast, if it is determined that the same NAN device did not transmit the plurality of publish messages (No in step S405), the display control unit 305 displays a plurality of pieces of information that correspond to the plurality of publish messages on the display unit 205 (step S407). A display appearance in such a case may be one where they are displayed together, one where it is possible to identify a service for each NAN device, or the like.

Figure 5:
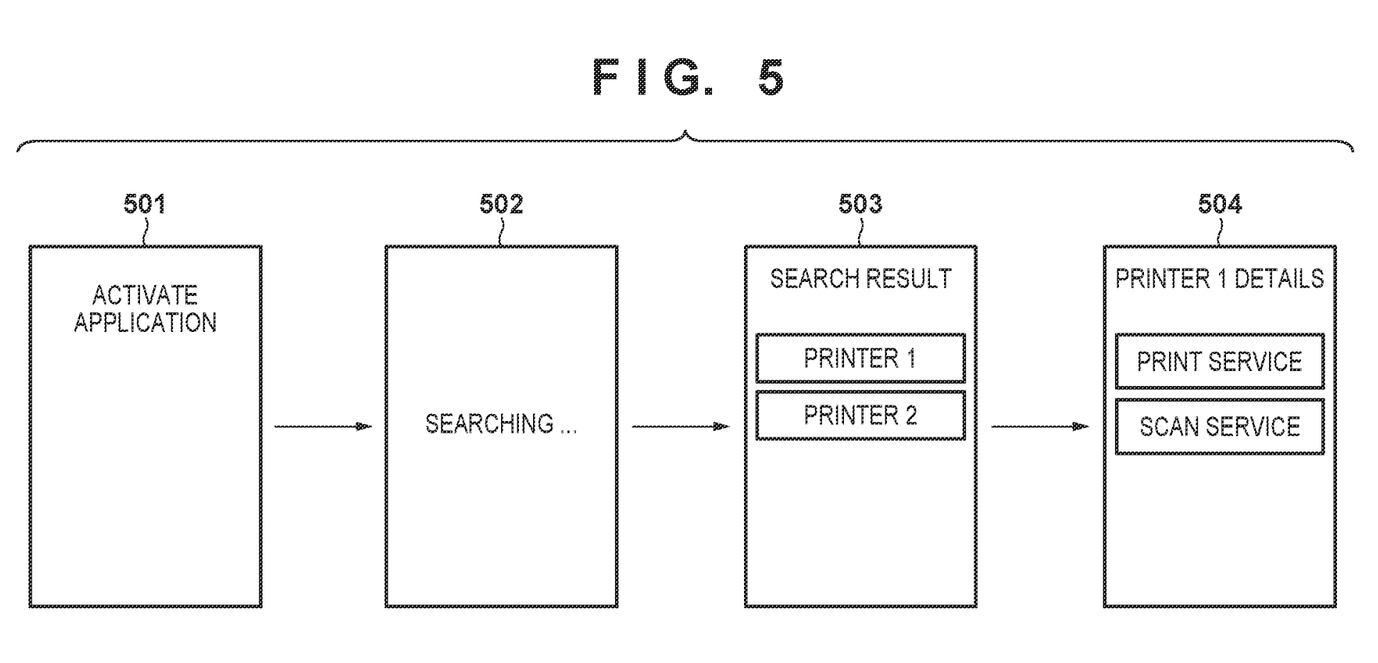
FIG. 5 is an example of a screen in a display unit 205.

FIG. 5 is an example of screens displayed on the display unit 205 of the NAN 101 which operates in accordance with the flowchart illustrated by FIG. 4. Firstly, when an application that uses a print service and a scan service is activated via the input unit 204 by a user, the display control unit 305 displays a screen 501 on the display unit 205. Next, when a search for a service with respect to a service provided by NAN is instructed by a user via the input unit 204, processing in accordance with the flowchart illustrated in FIG. 4 is started, and the display control unit 305 displays a screen 502 which indicates that the search is underway.

As a result of the service search (step S401 and step S402), if the NAN control unit 302 receives a plurality of publish messages (step S403 and step S404), it is determined whether the plurality of publish messages can be grouped per transmitting NAN device (step S405). When it is determined that the plurality of publish messages can be grouped per transmitting NAN device, the display control unit 305 groups them per transmitting NAN device, and displays a plurality of pieces of information corresponding to the plurality of publish messages on the display unit 205 (step S406).

In the example of FIG. 5, the display control unit 305 displays on the screen 503 information for allowing a user to select each of one or more other communication apparatuses (NAN devices). When one communication apparatus out of the one or more other communication apparatuses is selected on the screen 503 via the input unit 204 by a user, information corresponding to publish messages that have been grouped with respect to the selected communication apparatus is displayed on the screen 504. In other words, information corresponding to publish messages that have been grouped per other communication apparatus is displayed in accordance with the selection. For example, "print service" corresponding to a publish message that designates "net.abc.nan.print_service", and "scan service" corresponding to a publish message that designates "net.abc.nan.scan_service" are displayed.

In this way, in the present embodiment, it is possible to display information from the same device in one group when searching for services. As a result, it is possible to overcome a user misrecognizing an NAN device that can provide a plurality of services as a plurality of NAN devices that have respectively different services. From this, it is possible to improve convenience for a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-036737, filed Mar. 1, 2018 which is hereby incorporated by reference herein in its entirety.

What is claimed is:

1. A communication apparatus operable to comply with a NAN (Neighbor Awareness Networking) standard, comprising:
    one or more processors; and
    one or more memories including instructions stored thereon that, when executed by the one or more processors, cause the communication apparatus to function as:
    a receiving unit configured to receive a first publish message including information indicative of a first service and first identification information of a first other communication apparatus that is a transmitter of the first publish message and a second publish message including information indicative of a second service and second identification information of a second other communication apparatus that is a transmitter of the second publish message;
    a determination unit configured to determine, based on the first identification information and the second identification information, whether or not the first other communication apparatus is the same as the second other communication apparatus; and
    a display control unit configured to, in a case where it is determined that the first other communication apparatus is the same as the second other communication apparatus, display one piece of information indicating the first other communication apparatus or the second other communication apparatus without displaying both information indicating the first other communication apparatus and information indicating the second other communication apparatus even in a case where the first service indicated by the first publish message and the second service indicated by the second publish message are different from each other.

2. The communication apparatus according to claim 1, wherein the instructions further cause the communication apparatus to function as a grouping unit configured to, in a case where it is determined that the first other communication apparatus is the same as the second other communication apparatus, group the first publish message and the second publish message.

3. The communication apparatus according to claim 1, wherein each of the first identification information and the second identification information is a UUID (Universally Unique Identification).

4. The communication apparatus according to claim 1, wherein the first identification information is a number given at a time of manufacturing to the first other communication apparatus and the second identification information is a number given at a time of manufacturing to the second other communication apparatus.

5. The communication apparatus according to claim 1, wherein each of the first identification information and the second identification information is address information of an NAN interface for performing communication compliant with a NAN standard.

6. The communication apparatus according to claim 1, wherein
    the display control unit causes a display unit to display, on a first screen in the display unit, information for allowing a user to select each of one or more other communication apparatuses, and
    if one out of the one or more other communication apparatuses is selected by the user in the first screen, causes the display unit to display, on a second screen in the display unit, information relating to a service provided by the selected other communication apparatus.

7. The communication apparatus according to claim 1, wherein the instructions further cause the communication apparatus to function as a transmission unit configured to transmit a subscribe message, wherein the receiving unit receives a publish message transmitted in response to the subscribe message.

8. A method of controlling a communication apparatus compliant with a NAN (Neighbor Awareness Networking) standard, the method comprising:
    receiving a first publish message including information indicative of a first service and first identification information of a first other communication apparatus that is a transmitter of the first publish message and a second publish message including information indicative of a second service and second identification information of a second other communication apparatus that is a transmitter of the second publish message;

determining, based on the first identification information and the second identification information, whether or not the first other communication apparatus is the same as the second other communication apparatus; and in a case where it is determined that the first other communication apparatus is the same as the second other communication apparatus, displaying one piece of information indicating the first other communication apparatus or the second other communication apparatus without displaying both information indicating the first other communication apparatus and information indicating the second other communication apparatus even in a case where the first service indicated by the first publish message and the second service indicated by the second publish message are different from each other.

9. A non-transitory computer-readable storage medium storing a computer program for causing a computer to execute a method of controlling a communication apparatus compliant with a NAN (Neighbor Awareness Networking) standard, the method comprising:

receiving a first publish message including information indicative of a first service and first identification information of a first other communication apparatus that is a transmitter of the first publish message and a second publish message including information indicative of a second service and second identification information of a second other communication apparatus that is a transmitter of the second publish message;

determining, based on the first identification information and the second identification information, whether or not the first other communication apparatus is the same as the second other communication apparatus; and in a case where it is determined that the first other communication apparatus is the same as the second other communication apparatus, displaying one piece of information indicating the first other communication apparatus or the second other communication apparatus without displaying both information indicating the first other communication apparatus and information indicating the second other communication apparatus even in a case where the first service indicated by the first publish message and the second service indicated by the second publish message are different from each other.

* * * * *